W. SHARP.
Axle-Box.

No. 27,314.

Patented Feb. 28, 1860.

WITNESSES:
J. Fraser
S. J. Allis

INVENTOR:
William Sharp

UNITED STATES PATENT OFFICE.

WM. SHARP, OF MILLPORT, NEW YORK.

BOX FOR CARRIAGE-WHEELS.

Specification of Letters Patent No. 27,314, dated February 28, 1860.

*To all whom it may concern:*

Be it known that I, WILLIAM SHARP, of Millport, in the county of Chemung and State of New York, have invented a new and Improved Method of Constructing the Boxes and Bearings of Carriage-Wheels; and I do hereby declare that the following is a full and exact description of the construction thereof, reference being had to the annexed drawings, making part of this specification, and to the letters of reference marked thereon.

Figure 1:
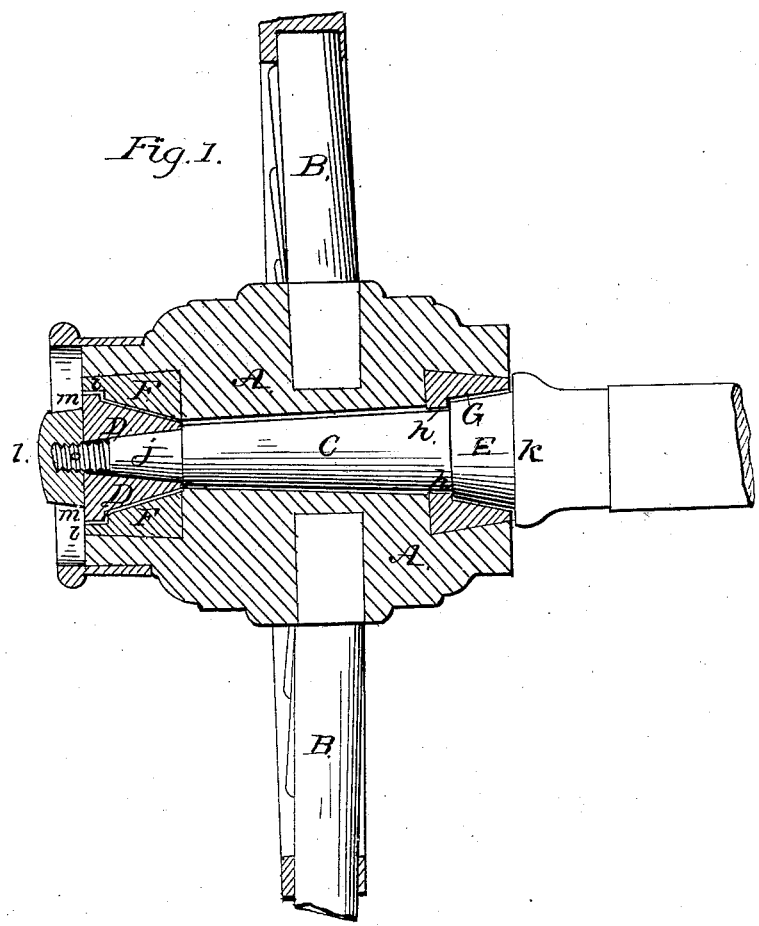
Figure 2:
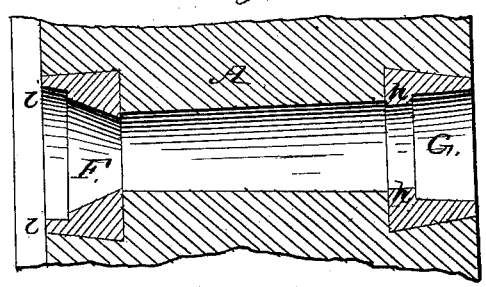

Figure 1, is a longitudinal section of the hub and outer cone-bearing, showing the arm of the axle in elevation. Fig. 2, is a section showing the beveled form of the boxes.

Similar letters refer to corresponding parts in both of the figures.

The nature of my invention consists in employing conical or beveled bearings of unequal inclination at each end of the hub, having their inclinations in reversed or opposing directions for purposes hereinafter explained.

As represented in the drawings, A is the hub, B B the spokes, and C the arm of the axle.

D is the beveled bearing at the outer, and E that at the inner end of the hub, having boxes F, G, of corresponding bevel on which alone the weight rests, the intermediate portion of the hub not being in contact with the arm. The box G, is provided with a rim or flange *h h*, which fits against the inner end of the beveled bearing E, while the box F, has an annular recess *i i* in its outer end in which a rim, *m m*, on the bearing D, is fitted. The former resists the inward thrust of the wheel and thereby reduces the wear of the shoulder band *k*, while together they prevent the escape of the oil at either end, and obviate too much side motion of the wheel on the axle. The bearing D is held on the cone *j* on the end of the arm by tightening the nut *l* on the screw *o*. The screw being connected with, or a part of, the axle and the nut pressing it directly on the cone, it is firmly held from turning with the wheel and therefore cannot possibly unscrew the nut and allow the wheel to run off, as often occurs when the nut is in contact with the hub or box.

All carriage wheels have a tendency to run off the axle arising both from their dishing form and from the arm diminishing toward the end. This involves much wear on the fastening at the end of the axle, and exerts a considerable retarding influence from the friction created. This effect is imperfectly remedied by inclining the arm of the axle forward, but in an unphilosophical manner, as it places the wheel in an oblique position with the direction of its travel—but my method of construction effectually overcomes this difficulty.

By using two cone bearings opposing each other, (D E,) the effect of the weight on the axle is to cause the wheel in its travel to seek the center, or that point at which the bevels would intersect if their lines were continued; and by making the inclination of the outer bearing greater than that of the inner one, the tendency of the wheel to run off is compensated. By observation and experiment the mechanic will learn to adapt this difference in the inclination of the bearings to the aberration of the wheel (which is governed by its diameter, weight of rim, and dishing form), by making it more or less as required, and the results are that the wheels run with much greater ease from the friction being for the most part overcome, and require far less play on the axle; have no noise or rattling in their boxes from their motion, and are immeasurably more durable.

The accumulated force derived from the velocity of the wheel's rotation instead of being partly expended in grinding and wearing the axle-fastening is by this construction exerted in carrying forward the vehicle, the only loss being from the small amount of friction which occurs in the two bearings D E. All strain as well as friction is removed from the linchpin or fastening, and the carriage moves with ease and freedom from noise and vibrations. The wheels are rendered more durable by this method also, as by running directly in the line in which the vehicle moves they are relieved of much strain which they otherwise receive caused by the "gather in the arm" as technically termed which consists in bending the arm slightly forward of the line of the axle, thereby turning the forward portion of the wheels toward the center in order to overcome their tendency to crowd off their fastenings.

The inner bearing E, may form a part of the axle if a metal one is used, but in order to get the wheel on and off the outer one D, must be removable, or there must be a joint in the axle between the two bearings that may take apart. I prefer the former method and make the part of the axle which receives the piece D, conical in order to make it hold firmly by friction when the nut $l$ on the screw is sufficiently tightened. This also makes the joint oil-tight and the construction is such that it is hardly possible for the oil to escape unless used in great excess.

I do not claim the employment of reverse conical bearings and boxes, of equal degrees of inclination, such not accomplishing the purpose of my invention; but

What I claim as my invention and desire to secure by Letters Patent, is—

Constructing the wheels of carriages and other vehicles with reversed beveled bearings, and boxes of corresponding form, the outer of said bearings having the greater inclination of the two, substantially as and for the purpose herein set forth.

WILLIAM SHARP.

Witnesses:
J. FRASER,
S. J. ALLIS.